US009812777B2

(12) United States Patent
Johansson et al.

(10) Patent No.: US 9,812,777 B2
(45) Date of Patent: Nov. 7, 2017

(54) LOAD BALANCING OF DUAL-POLARIZED ANTENNAS

(71) Applicant: TELEFONAKTIEBOLAGET L M ERICSSON (PUBL), Stockholm (SE)

(72) Inventors: Martin Johansson, Molndal (SE); Sven Petersson, Savedalen (SE); Bo Goransson, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 619 days.

(21) Appl. No.: 14/137,953

(22) Filed: Dec. 20, 2013

(65) Prior Publication Data

US 2015/0180121 A1 Jun. 25, 2015

(30) Foreign Application Priority Data

Dec. 19, 2013 (WO) .................. PCT/EP2013/077537

(51) Int. Cl.
*H01Q 3/24* (2006.01)
*H01Q 25/04* (2006.01)
*H01Q 1/24* (2006.01)
*H01Q 21/24* (2006.01)
*H01Q 21/28* (2006.01)
*H04B 7/06* (2006.01)

(52) U.S. Cl.
CPC .............. *H01Q 3/24* (2013.01); *H01Q 1/246* (2013.01); *H01Q 21/24* (2013.01); *H01Q 21/28* (2013.01); *H01Q 25/04* (2013.01); *H04B 7/0617* (2013.01)

(58) Field of Classification Search
USPC ......................................................... 342/361
See application file for complete search history.

(56) References Cited

U.S. PATENT DOCUMENTS 4,596,986 A * 6/1986 Andrews ............... G01S 7/2813
342/373
4,970,519 A * 11/1990 Minnis ..................... G01S 13/32
332/145

(Continued)

FOREIGN PATENT DOCUMENTS

EP 1182799 A2 2/2002

OTHER PUBLICATIONS

"Impact of VAM on legacy UEs," Nokia Siemens Networks, R1-121724, 3GPP TSG RAN WG1 Meeting #68bis, Jeju, Korea, Mar. 26-30, 2012, 4 pages.

(Continued)

*Primary Examiner* — Sean P Burke
(74) *Attorney, Agent, or Firm* — Rothwell, Figg, Ernst & Manbeck, P.C.

(57) ABSTRACT

There is provided a dual-polarized N/2-column antenna arrangement. The antenna module arrangement comprises a coupler module. The coupler module is arranged to direct a first summation of energy from signals from a first distinct set of power amplifiers of an N-channel radio to a first single output port connected to a first polarization of a first column of the dual-polarized N/2-column antenna arrangement. The coupler module is arranged to direct a second summation of energy from signals from a second distinct set of power amplifiers of the N-channel radio to a second single output port connected to a second polarization of a second column of the dual-polarized N/2-column antenna arrangement.

15 Claims, 6 Drawing Sheets

(56) References Cited

U.S. PATENT DOCUMENTS

| | | | |
|---|---|---|---|
| 5,508,706 A * | 4/1996 | Tsou | B60Q 1/0023 342/110 |
| 5,933,788 A | 8/1999 | Faerber et al. | |
| 6,823,177 B1 * | 11/2004 | Lucidarme | H04B 7/10 343/797 |
| 2007/0013582 A1 * | 1/2007 | Kwon | G01S 7/026 342/188 |

OTHER PUBLICATIONS

Search report in application PCT/EP2013/077537 dated Aug. 7, 2014, 6 pages.

* cited by examiner

LOAD BALANCING OF DUAL-POLARIZED ANTENNAS

CROSS REFERENCE TO RELATED APPLICATION(S)

The present application claims the benefit of priority to PCT/EP2013/077537, filed Dec. 19, 2013, the disclosure of which is incorporated herein in its entirety by reference.

TECHNICAL FIELD

Embodiments presented herein relate to load balancing of dual-polarized antennas, and particularly to a method, and an antenna module arrangement for load balancing of a dual-polarized antenna.

BACKGROUND

In general terms, codebook based transmission in combination with multiple dual-polarized antennas generate radiations patterns that are the result of coherent free-space summation of the signals from co-polarized antenna elements and incoherent (power sum) summation of signals from orthogonally polarized antenna elements. Thus, generally, the relative phase values (and amplitude values) of signals intended for co-polarized elements will influence the shape of the resulting patterns.

A combined unit consisting of a separate phase-coherent four-channel radio connected to a separate phase-coherent array antenna, with all phase delays assumed known, generates radiation patterns that can be deterministically predicted provided that no other sources of phase delays are present. However, when the connections between radio and antenna, primarily cable connections, are installed on-site, no knowledge of the additional cable phase delay can be assumed to be available. In addition, the antenna may be an off-the-shelf product with unknown internal phase properties. Hence, there may be a risk that the resulting radiation patterns are unknown. Further, the resulting radiation patterns may potentially have undesirable radiation properties if the radio and antenna are combined without taking the phase delays into account. This issue may be of particular relevance for single-stream transmission of cell-covering (legacy) signals.

A four-channel radio for multi-layer transmission should also support single-stream transmission of legacy signals with uniform load-balancing over the power amplifiers. With unknown phase delays (cable lengths) between the radio and a multi-column array antenna, the single-stream signal may experience unknown phase rotations for each antenna port, resulting in array antenna patterns with unknown shape and pointing direction.

Assuming unknown phase values for each cable connection, one way to guarantee desired antenna pattern characteristics involves calibration of the radio-cable-antenna signal paths such that any variations in phase between the different signal paths can be compensated for. However, calibration of the entire set of radio, cable, and antenna transmission chains requires that the radio supports calibration and that the array antenna is equipped with calibration hardware (such as branchline couplers and calibration port). The former adds complexity and the latter is typically not the case for off-the-shelf antennas.

Another way to guarantee desired antenna pattern characteristics involves usage of implicit indicators of coverage performance, for example based on feedback signaling from wireless terminals to the network node, to control the relative phase settings of the different signal paths at the network node. Such implicit indicators of coverage performance may adjust the system to perform well in terms of the feedback measures, but only for the set of locations occupied by active wireless terminals. This means that the actual coverage area is unknown, which can result in coverage holes, for example along sector borders between adjacent co-sited antennas.

The international patent application WO 2011/005162 A1 discloses a system with four (parallel) power amplifiers feeding a dual-column, dual-polarized array antenna where a signal from each of four effective ports will be amplified by all amplifiers. The international patent application WO 2012/166030 A1 relates to creating (near) orthogonal power balanced ports for transmission using 1, 2 and 4 transmitters. A phased matched system is used to guarantee well shaped sector covering beams. However, there is still a need for an improved load balancing of dual-polarized antennas.

SUMMARY

An object of embodiments herein is to provide improved load balancing of dual-polarized antennas.

According to a first aspect there is presented a method for load balancing of a dual-polarized N/2-column antenna arrangement. The method is performed by a coupler module. The method comprises directing a first summation of energy from signals from a first distinct set of power amplifiers of an N-channel radio to a first single output port connected to a first polarization of a first column of the dual-polarized N/2-column antenna arrangement. The method comprises directing a second summation of energy from signals from a second distinct set of power amplifiers of the N-channel radio to a second single output port connected to a second polarization of a second column of the dual-polarized N/2-column antenna arrangement.

Advantageously this provides improved load balancing of dual-polarized antennas.

Advantageously this provides a robust solution to the problem of providing simultaneous power amplifier load-balancing and sector coverage for single-stream legacy signals transmitted by four-port radios connected to dual-polarized dual-column array antennas.

According to an embodiment the method further comprises directing first zero energy from said signals from said first distinct set of power amplifiers to at least a third single output port of the coupler module. According to an embodiment the method further comprises directing a second zero energy from said signals from said second distinct set of power amplifiers to at least a fourth single output port of the coupler module.

According to a second aspect there is presented a dual-polarized N/2-column antenna arrangement. The antenna arrangement comprises a coupler module. The coupler module is arranged to direct a first summation of energy from signals from a first distinct set of power amplifiers of an N-channel radio to a first single output port connected to a first polarization of a first column of the dual-polarized N/2-column antenna arrangement. The coupler module is arranged to direct a second summation of energy from signals from a second distinct set of power amplifiers of the N-channel radio to a second single output port connected to a second polarization of a second column of the dual-polarized N/2-column antenna arrangement.

According to an embodiment the coupler module is arranged to direct a first zero energy from said signals from said first distinct set of power amplifiers to at least a third single output port of the coupler module. According to an embodiment the coupler module is arranged to direct a second zero energy from said signals from said second distinct set of power amplifiers to at least a fourth single output port of the coupler module.

According to a third aspect there is presented a network node comprising a dual-polarized N/2-column antenna arrangement according to the second aspect.

According to a fourth aspect there is presented a wireless terminal comprising a dual-polarized N/2-column antenna arrangement according to the second aspect.

It is to be noted that any feature of the first, second, third, and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional. This does not apply to the dashed and dotted signal paths in FIGS. 2, 4, 5, 7, and 9.

Figure 1:
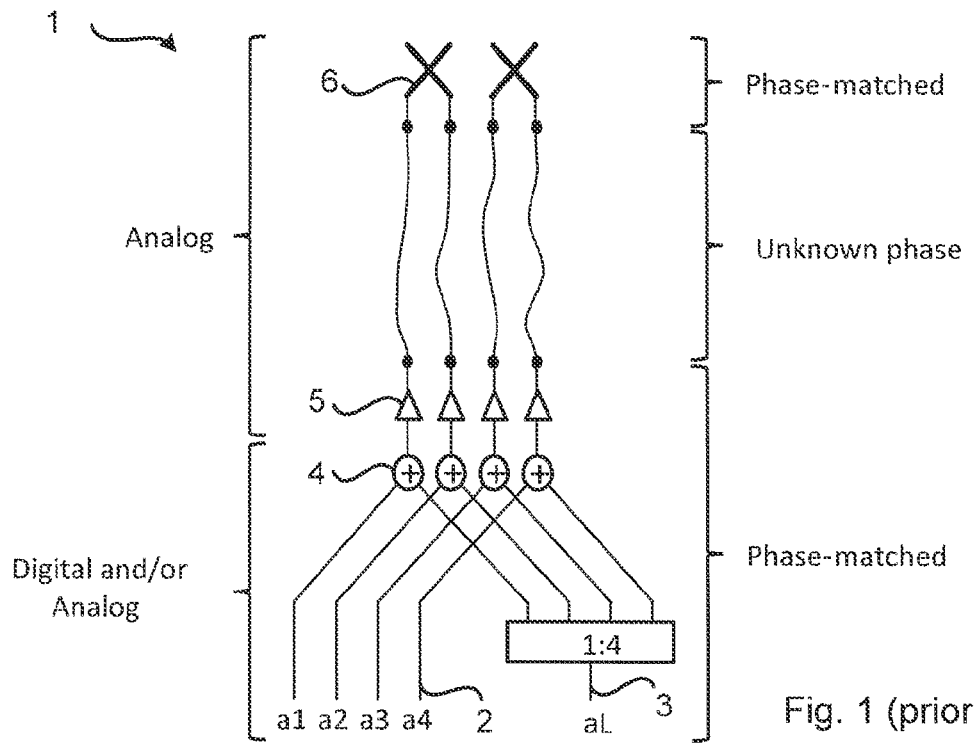
FIG. 1 is a schematic diagram illustrating an antenna arrangement according to prior art.

FIG. 1 is a schematic diagram illustrating an antenna arrangement 1 according to prior art. In more detail, FIG. 1 schematically illustrates a dual-polarized N/2-column antenna arrangement where N=4. The antenna arrangement 1 comprises a four-branch radio (i.e., four radio-frequency chains) and one dual-column, dual-polarized array antenna. A single-stream signal legacy signal {aL} is combined in combiners 4 with a multi-stream signal {a1, a2, a3, a4}. The radio chain is phase-matched all the way to the output ports of the RF (radio-frequency) front-end, including the power amplifiers 5. The connections (cables) between the power amplifiers 5 and the antenna 6 have unknown phase. The antenna 6 (i.e., the antenna columns) is similarly phase-matched from the antenna connectors to the radiating elements.

This known antenna arrangement 1 uses a single-stream signal legacy signal {aL} which is assumed to have uniform amplitude and phase. Since the cable phase values are unknown, a signal with all ones at the output of the radio may have arbitrary relative phase values at the antenna connectors. This means that the resulting antenna beam for the legacy signal has unknown shape, and the coverage area of said beam is likewise unknown, which is undesirable.

The embodiments disclosed herein relate to load balancing of dual-polarized antennas. In order to obtain load balancing of dual-polarized antennas there is provided a dual-polarized N/2-column antenna arrangement comprising a coupler module, and a method performed by the coupler module.

Figure 10A:
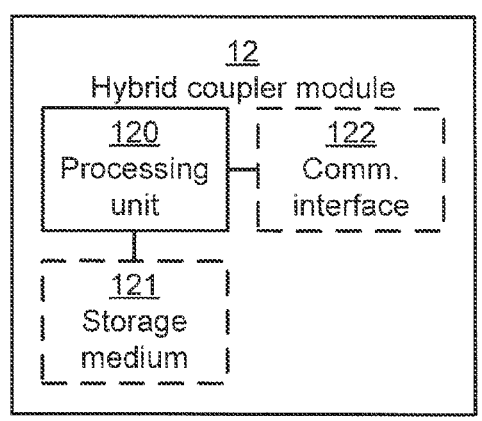
FIG. 10a is a schematic diagram showing functional modules of a coupler module according to an embodiment.

FIG. 10a schematically illustrates, in terms of a number of functional modules, the components of a coupler module 12 according to an embodiment. A processing unit 120 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 110 (as in FIG. 11), e.g. in the form of a storage medium 121. Thus the processing unit 120 is thereby arranged to execute methods as herein disclosed. The a storage medium 121 may also comprise persistent storage, which, for example, can be any single one or combination of magnetic memory, optical memory, solid state memory or even remotely mounted memory. The coupler module 12 may further comprise a communications interface 122 for receiving and transmitting signals. As such the communications interface 122 may comprise one or more ports, comprising analogue and digital components. The processing unit 120 controls the general operation of the coupler module 12 e.g. by sending signals to the communications interface 122 and the storage medium 121, by receiving signals from the communications interface 122, and by retrieving data and instructions from the storage medium 121. Other components, as well as the related functionality, of the coupler module 12 are omitted in order not to obscure the concepts presented herein.

Figure 10B:
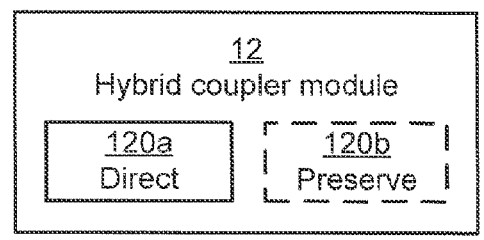
FIG. 10b is a schematic diagram showing functional units of a coupler module according to an embodiment.

FIG. 10b schematically illustrates, in terms of a number of functional units, the components of a coupler module 12 according to an embodiment. The coupler module 12 of FIG. 10b comprises a directing unit, 120a. The coupler module 12 of FIG. 10b may further comprises a number of optional functional units, such as a preserving unit 120b. The functionality of each functional unit 120a-b will be further disclosed below in the context of which the functional units may be used. In general terms, each functional unit 120a-b may be implemented in hardware or in software. The processing unit 120 may thus be arranged to from the storage medium 121 fetch instructions as provided by a functional unit 120a-b and to execute these instructions, thereby performing any steps as will be disclosed hereinafter.

Figure 10C:
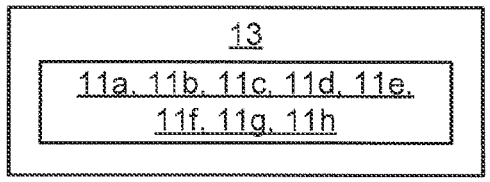
FIG. 10c is a schematic diagram illustrating a network node comprising an antenna arrangement according to an embodiment.
Figure 10D:
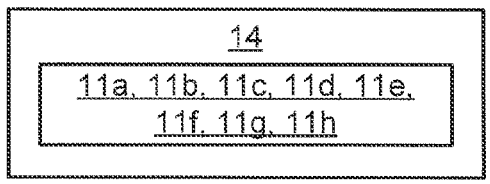
FIG. 10d is a schematic diagram illustrating a wireless terminal comprising an antenna arrangement according to an embodiment.

The coupler module 12 may be provided as a standalone device or as a part of a further device. For example, the coupler module 12 may be provided in a network node 13. FIG. 10c schematically illustrates a network node 13 comprising an antenna arrangement as herein disclosed. The network node 13 may be a radio base station, such as a base transceiver station, a Node B, an Evolved Node B, or the like. For example, the coupler module 12 may be provided in a wireless terminal 14. FIG. 10d schematically illustrates a wireless terminal 14 comprising an antenna arrangement as herein disclosed. The wireless terminal 14 may be a mobile phone, a user equipment, a smartphone, a tablet computer, a laptop computer, or the like. The coupler module 12 may be provided as an integral part of the network node 13 or wireless terminal 14. That is, the components of the coupler module 12 may be integrated with other components of the network node 13 or wireless terminal 14; some components of the network node 13 or wireless terminal 14 and the coupler module 12 may be shared.

Figure 11:
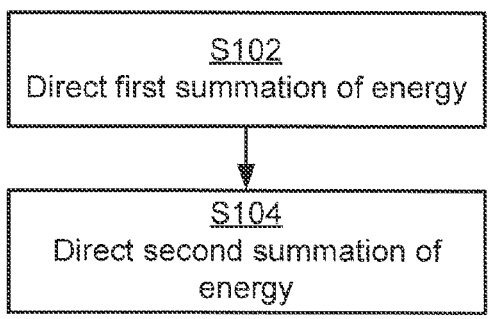
FIGS. 11 and 12 are flowcharts of methods according to embodiments.
Figure 12:
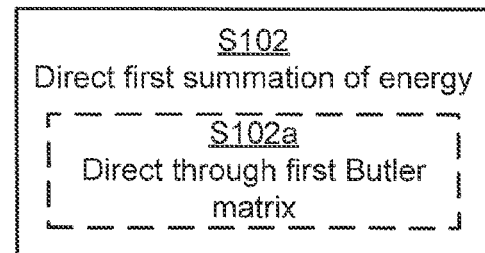
Figure 12:
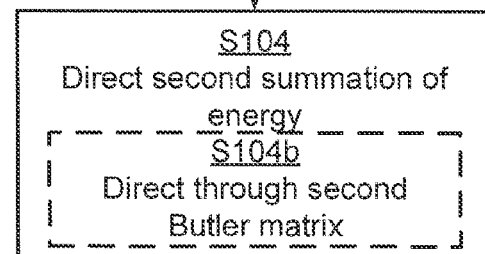
Figure 12:
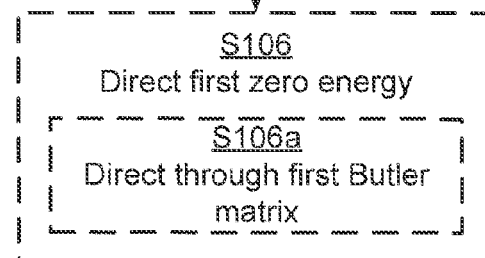
Figure 12:
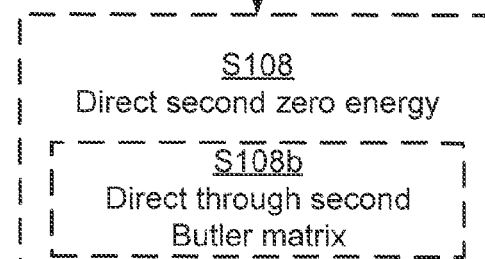
Figure 12:
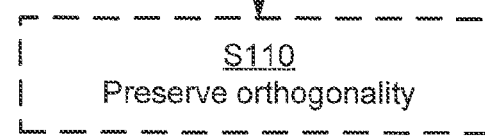

FIGS. 11 and 12 are flow charts illustrating embodiments of methods for load balancing of dual-polarized antennas. The methods are performed by the coupler module 12.

The coupler module 12 may be applied directly on the radio output (assuming transmission) ports from the power amplifiers 5 to guarantee that a single-stream transmission with uniform load-balancing over all power amplifiers, with known phase values at the radio output ports, in combination with a dual-column, dual-polarized array antenna will produce a sector-covering radiation pattern for any individual phase delays of the cables connecting the antenna to the N-channel radio via the coupler module 12.

In particular, the herein disclosed embodiments are based on directing a summation energy from N/2 power amplifiers 5 of the N-channel radio to a first single output port of the coupler module 12, this output port being connected to a first polarization of the first column of the dual-polarized, dual-column antenna, and directing a summation of energy from the remaining N/2 power amplifiers of the N-channel radio to a second single output port of the coupler module 12, this second output port being connected a second polarization of the second column of the array antenna. Thus, no coherent addition is possible, and the resulting pattern is the column pattern of the array antenna, with unknown polarization.

Figure 2:
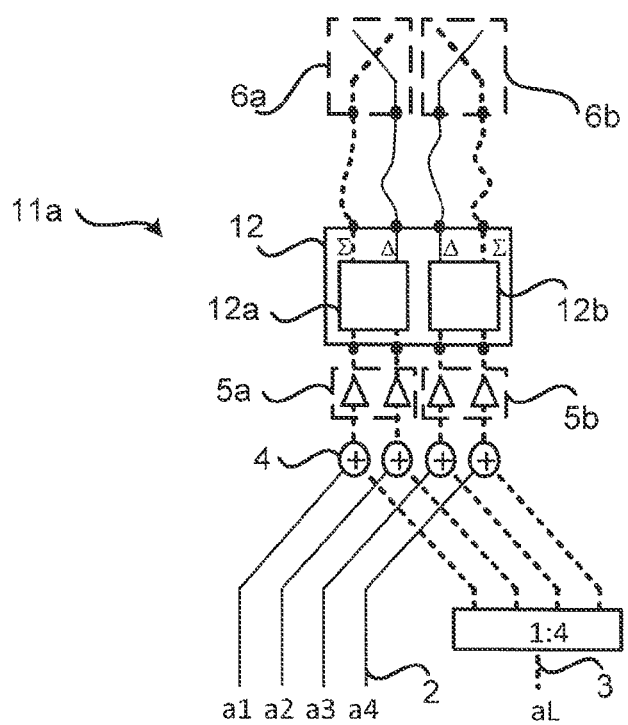
FIGS. 2-9 are schematic diagrams illustrating antenna arrangements according to embodiments.

Reference is now made to FIG. 11 illustrating a method for load balancing of a dual-polarized N/2-column antenna arrangement according to an embodiment. Reference is also made to FIG. 2 schematically illustrating a dual-polarized N/2-column antenna arrangement 11a according to one embodiment. The N/2-column antenna arrangement 11a of FIG. 2 is similar to the N/2-column antenna arrangement 1 of FIG. 1. In the N/2-column antenna arrangement 11a of FIG. 2 a coupler module 12 is applied between the RF front-end (i.e., at the out ports of the power amplifiers 5a, 5b) and the antenna columns 6a, 6b.

The coupler module 12 is arranged to, in a step S102, direct a first summation of energy from signals from a first distinct set of power amplifiers 5a of an N-channel radio to a first single output port connected to a first polarization of a first column 6a of the dual-polarized N/2-column antenna arrangement. The coupler module 12 is arranged to, in a step S104, direct a second summation of energy from signals from a second distinct set of power amplifiers 5b of the N-channel radio to a second single output port connected to a second polarization of a second column 6b of the dual-polarized N/2-column antenna arrangement.

Hence, a first summation of energy of the coupler 12 is connected to the two polarizations of a first antenna column 6a with the sum-port ($\Sigma$) connected to a first polarization, and the second summation of energy of the coupler 12 is connected to the two polarizations of a second antenna column 6b with the sum-port ($\Sigma$) connected to a second polarization, orthogonal to the first polarization. This provides uniform power amplifier utilization (i.e., load-balancing) for single-stream transmission, which for example may be downlink HSPA, for an antenna arrangement comprising an N-branch radio feeding a dual-column, dual-polarized antenna. The antenna arrangement is suitable for N-stream multiple input multiple output (MIMO) transmission.

In FIG. 2, the signal paths for a single-stream legacy signal $\{aL\}$ is indicated by dashed lines. A signal $\{aL\}$ with equal-phase, uniform amplitude weight vector at the input ports of the coupler module 12 will thus be distributed to orthogonal polarizations of the two antenna columns 6a, 6b, resulting in a radiation pattern that has the shape of an individual antenna column. The resulting polarization of the radiation pattern is unknown, since the two antenna columns 6a, 6b will radiate orthogonally polarized patterns with unknown relative phase, but the angular power envelope is identical to the radiation pattern for a signal transmitted using only one cable. Thus, the herein disclosed embodiments provide the same cell coverage for single-stream legacy signals as for the reference signals of the multi-stream system.

Embodiments relating to further details of load balancing of a dual-polarized N/2-column antenna arrangement will now be disclosed.

Each one of the first distinct set of power amplifiers 5a of the N-channel radio and the second distinct set of power amplifiers 5b of the N-channel radio set may comprise N/2 number of elements. According to one embodiment N is 4. According to anther embodiment N is 8.

Reference is made to FIG. 12 illustrating methods for load balancing of a dual-polarized N/2-column antenna arrangement according to further embodiments.

There may be further ways to direct the signals from the first distinct set of power amplifiers 5a and the signals from the second distinct set of power amplifiers 5b.

According to an embodiment the coupler module 12 is arranged to, in an optional step S106, direct a first zero energy from the signals from the first distinct set of power amplifiers 5a to at least a third single output port of the coupler module 12. According to an embodiment the coupler module 12 is arranged to, in an optional step S108, direct zero energy from the signals from the second distinct set of power amplifiers 5b to at least a fourth single output port of the coupler module 12. Orientation of the at least one third single output port and the at least one fourth single output port may be mirrored compared to orientation of the first single output port and the second single output port. Generally, the term orientation as herein used is to be understood as a functional property; the first and second output ports are connected to different polarizations. This is achieved by connecting the output ports to the proper antenna columns and polarizations. Using sum-ports and delta-ports with swapped positions is merely a way to avoid drawing crossing cables. The second polarization of the first column may thus be orthogonal to the first polarization of the second column. Hence, according to this embodiment a first zero energy of the coupler 12 is connected to the two polarizations of a first antenna column 6a with the delta-port (Δ) connected to the second polarization, and the second zero energy of the coupler 12 is connected to the two polarizations of a second antenna column 6b with the delta-port (Δ) connected to the first polarization, orthogonal to the second polarization.

There may be different ways to realize the coupler 12. Different embodiments relating thereto will now be described in turn.

The coupler 12 may constitute a transformation matrix T between the output ports of the RF front-end of power amplifiers 5a, 5b and the cables running to the antenna columns 6a, 6b. For example, the coupler 12 may comprise a first and a second Butler matrix with one output port providing the first and the second summation of energy, respectively. Particularly, according to an embodiment the coupler module 12 is arranged to, in an optional step S102a, direct the signals from the first distinct set through a first N/2×N/2 Butler matrix 12a, a first output port of which providing the first summation. According to this embodiment the coupler module 12 is arranged to, in an optional step S102b, direct the signals from the second distinct set through a second N/2×N/2 Butler matrix 12b, a first output port of which providing the second summation. Preferably, the transformation matrix T provides a unitary transformation from input ports to output ports.

The first and the second Butler matrix may have at least one output port providing the first and the second zero energy, respectively. According to an embodiment the coupler module 12 is thus arranged to, in an optional step S106a, direct the signals from the first distinct set through the first N/2×N/2 Butler matrix 12a, at least a second output port of which providing the first zero energy. According to this embodiment the coupler module 12 is arranged to, in an optional step S106b, direct the signals from the second distinct set through the second N/2×N/2 Butler matrix 12b, at least a second output port of which providing the second zero energy.

The use of hybrid couplers may enable orthogonality between the multi-stream signals {a1, a2, a3, a4} to be preserved. Hence, the coupler module 12 may be is realized using hybrid couplers. According to an embodiment where the coupler module 12 is realized using hybrid couplers the coupler module 12 is arranged to, in an optional step S110, preserve orthogonality between all individual signals from the first distinct set and the second distinct set. Hence the first N/2×N/2 Butler matrix 12a and the second N/2×N/2 Butler matrix 12b may preserve the orthogonality between the multi-stream signals {a1, a2, a3, a4}.

There may be different constellations relating to where signals from each one of the first distinct set and the second distinct set originate from. Different embodiments relating thereto will now be described in turn.

Reference is made to FIG. 2 disclosing a dual-polarized N/2-column antenna arrangement 11a according to one embodiment. According to the embodiment of the dual-polarized N/2-column antenna arrangement 11a of FIG. 2 signals from each one of the first distinct set and the second distinct set originate from multi-stream signals {a1, a2, a3, a4} and one split single-stream signal {aL}.

The single-stream signal may be associated with one or more scale factors ($\alpha_n$), as in FIGS. 3-9. In general terms, $\alpha_n = \exp(j, \beta_n)$, where $\beta_n$ takes a value in the interval $[0, 2\pi]$.

Figure 3:
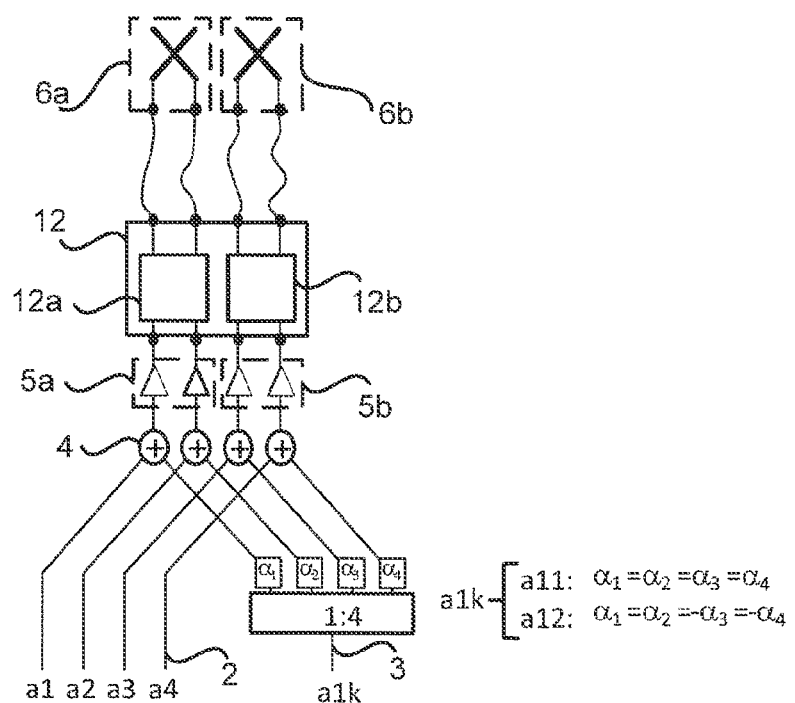

The scale factors may be unique for each split single-stream signal. Reference is now made to FIG. 3 disclosing a dual-polarized N/2-column antenna arrangement 11b according to one embodiment where N=4 and FIG. 8 disclosing a dual-polarized N/2-column antenna arrangement 11g according to another embodiment where N=8. The dual-polarized N/2-column antenna arrangement 11g thus comprises four antenna columns 6a, 6b, 6c, 6d. According to the embodiments of the dual-polarized N/2-column antenna arrangement 11b of FIG. 3 and the dual-polarized N/2-column antenna arrangement 11g of FIG. 8 signals from each one of the first distinct set and the second distinct set originate from multi-stream signals ({a1, a2, a3, a4} in FIG. 3, and ({a1, a2, a3, a4, a5, a6, a7, a8} in FIG. 8) and one split single-stream signal ({a1k} in FIG. 3, and two split single-stream signals or one dual-stream signal {a21, a22} in FIG. 8), wherein unique scale factors (($\alpha_1, \alpha_2, \alpha_3, \alpha_4$) in FIG. 3, and ($\alpha_1, \alpha_2, \alpha_3, \alpha_4, \alpha_5, \alpha_6, \alpha_7, \alpha_8$) in FIG. 8) have been applied to the split single-stream signal. Hence general scale factors (or weights) may be applied to the single-stream signal(s). It is to be noted that although the dual-polarized N/2-column antenna arrangement 11g may comprise one 1:8 splitter with an input {a2k} instead of two 1:4 splitters.

Figure 4:
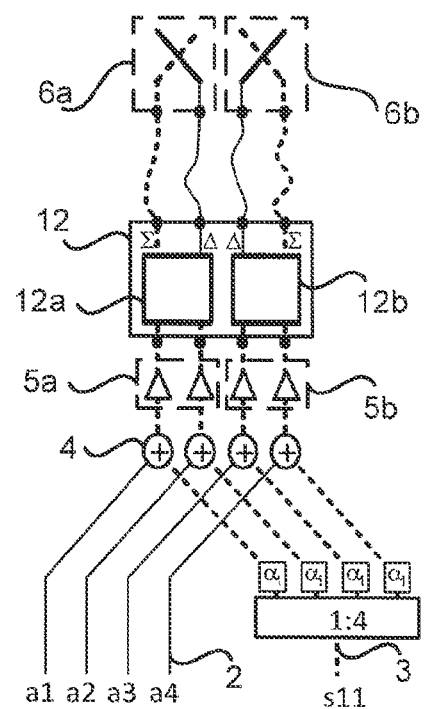

The scale factors may be the same for each split single-stream signal. Reference is now made to FIG. 4 disclosing a dual-polarized N/2-column antenna arrangement 11c according to one embodiment. According to the embodiment of the dual-polarized N/2-column antenna arrangement 11c of FIG. 4 signals from each one of the first distinct set and the second distinct set originate from multi-stream signals {a1, a2, a3, a4} and one split single-stream signal {a11}, wherein a common scale factor ($\alpha_1$) has been applied to the split single-stream signal.

Figure 5:
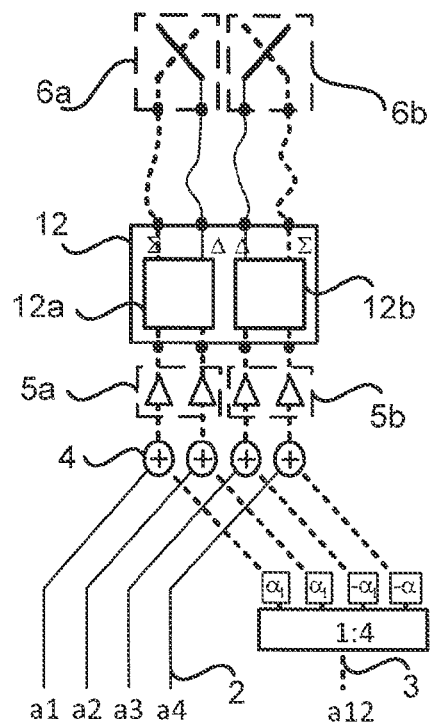

The scale factors may be signed but have the same absolute value. Reference is now made to FIG. 5 disclosing a dual-polarized N/2-column antenna arrangement 11d according to one embodiment where N=4, and FIG. 9 disclosing a dual-polarized N/2-column antenna arrangement 11h according to another embodiment where N=8. The dual-polarized N/2-column antenna arrangement 11h thus comprises four antenna columns 6a, 6b, 6c, 6d. According to the embodiment of the dual-polarized N/2-column antenna arrangement 11d of FIG. 5 and the dual-polarized N/2-column antenna arrangement 11h of FIG. 9 signals from each one of the first distinct set and the second distinct set originate from multi-stream signals ({a1, a2, a3, a4} in FIG. 5, and ({a1, a2, a3, a4, a5, a6, a7, a8} in FIG. 9) and one split single-stream signal ({a12} in FIG. 5, and two split single-stream signals {a21, a22} in FIG. 9), wherein scale factors (($\alpha_1, \alpha_1, -\alpha_1, -\alpha_1$) in FIG. 5 and ($\alpha_1, \alpha_1, \alpha_1, \alpha_1, \alpha_5, \alpha_5, \alpha_5, \alpha_5$) in FIG. 9) with same amplitude and at least two of which have opposite signs have been applied to the split single-stream signal. It is to be noted that although the dual-polarized N/2-column antenna arrangement 11h may comprise one 1:8 splitter with an input {a2k} instead of two 1:4 splitters. When comprising one 1:8 splitter the scale factors may be chosen such that $\alpha_5 = -\alpha_1$.

Figure 6:
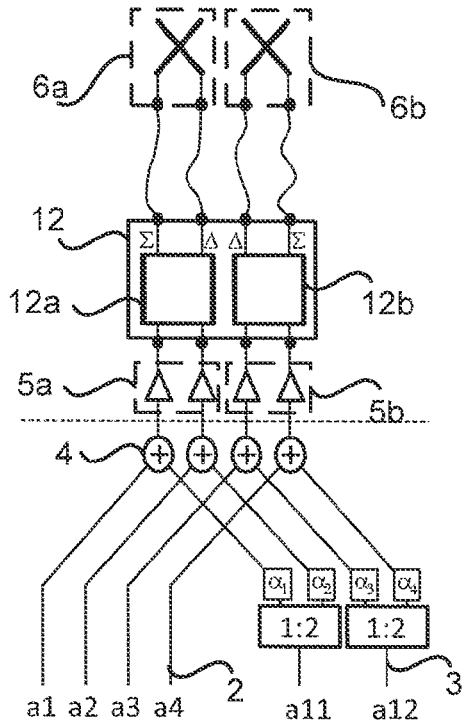

There may be two or more single-stream signals, where unique scale factors are applied to the split single-stream signals. Reference is now made to FIG. 6 disclosing a dual-polarized N/2-column antenna arrangement 11e according to one embodiment. According to the embodiment of the dual-polarized N/2-column antenna arrangement 11e of FIG. 6 signals from each one of the first distinct set and the second distinct set originate from multi-stream signals {a1, a2, a3, a4} and two split single-stream signals {a11, a12}, wherein unique scale factors ($\alpha_1, \alpha_2, \alpha_3, \alpha_4$) have been applied to the two split single-stream signals.

Figure 7:
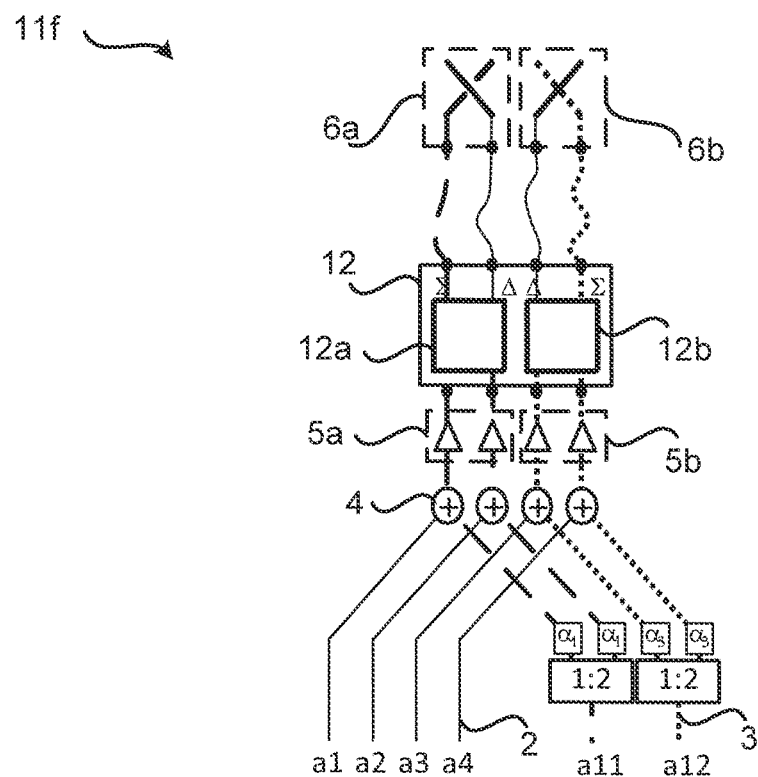
Figure 8:
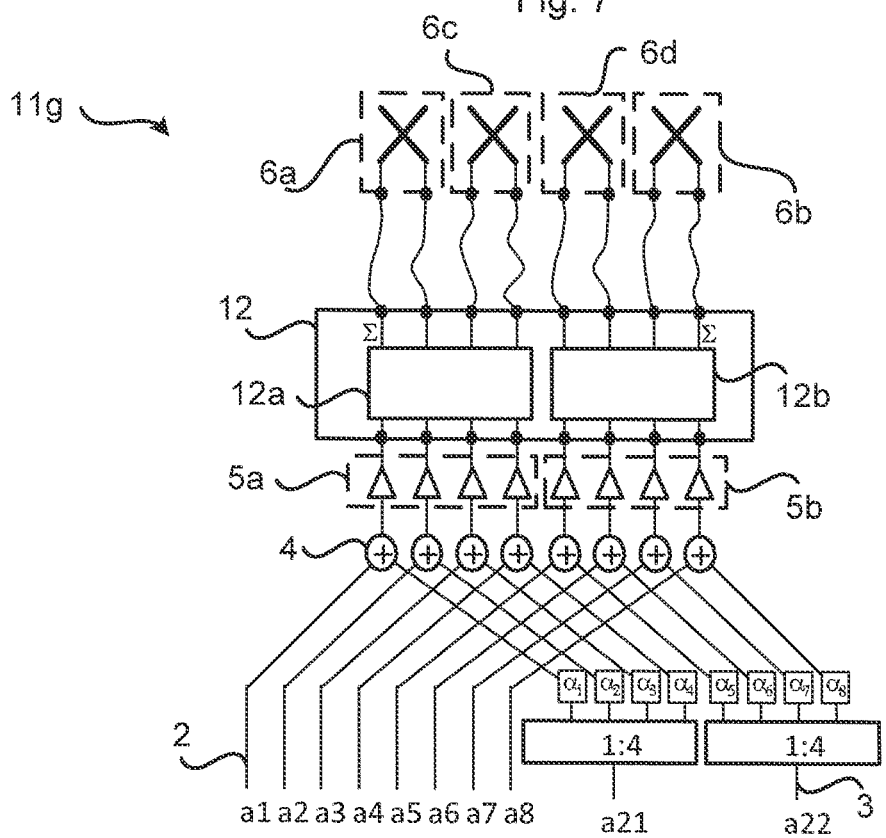
Figure 9:
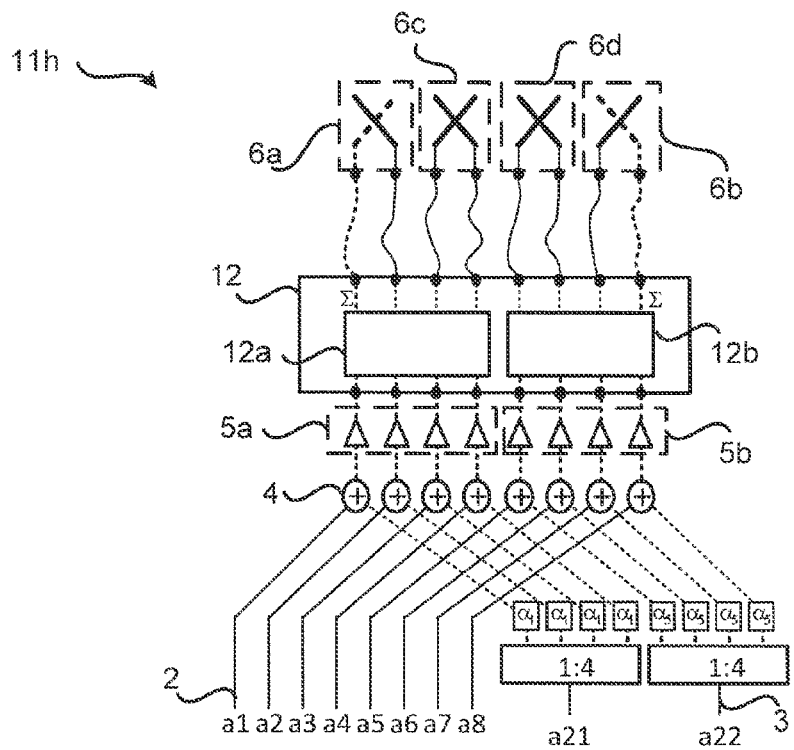

There may be two or more single-stream signals, where the same scale factors are applied to the split single-stream signals for each single-stream signal. Reference is now made to FIG. 7 disclosing a dual-polarized N/2-column antenna arrangement 11f according to one embodiment. According to the embodiment of the dual-polarized N/2-column antenna arrangement 11f of FIG. 7 signals from each one of the first distinct set and the second distinct set originate from multi-stream signals {a1, a2, a3, a4} and two split single-stream signals {a11, a12}, wherein a first common scale factor ($\alpha_1$) has been applied to one {a11} of the two split single-stream signals, and wherein a second common scale factor ($\alpha_3$) has been applied to another {a12} of the two split single-stream signals.

Figure 13:
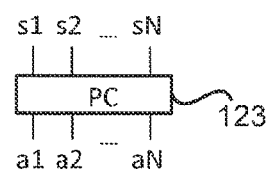
FIG. 13 schematically illustrates a pre coder.

Pre-coder (PC) weights, such as orthogonal weight vectors, may be applied to the multi-stream signals {a1, a2, a3, a4} before being fed to the combiners 4, thus generating corresponding PC weight vectors {s1, s2, s3, s4}, to provide decorrelation (over the radio channel) such that desired MIMO gains can be (ideally) realized. FIG. 13 schematically illustrates a pre coder 123 applying PC weights to multi-stream signals {a1, a2, . . . , aN}, thus producing weight vectors {s1, s2, . . . , sN}. In general terms, these weight vectors correspond to the phase and amplitude for each signal at each output port of the radio. Devices (such as wireless terminals 14) served by a communications system of which the transmit chain components of the herein disclosed dual-polarized N/2-column antenna arrangements 11a, 11b, 11c, 11d, 11e, 11f, 11g, 11h are part (such as in a network node 13) will measure independent reference signals transmitted via different paths of transmit chain. The devices can use these reference signal measurements to select PC weights for the data channel signals, since the reference signals experience the same unknown phase delays of the cables as any other signals, which means that the pre-coded transmission in insensitive to the specific phase delays. The use of hybrid couplers may provide a unitary transformation of the applied pre-coded signals, thus ensuring that vector orthogonality between the pre-coded signals is maintained.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

For example, the first summation of energy may be all energy of the signals from the first distinct set of power amplifiers, and the second summation of energy may be all energy of the signals from the second distinct set of power amplifiers.

For example, although the notation zero energy as herein used may refer to no energy at all, the term zero energy generally refers to an energy level substantially equal to zero. Hence, the first zero energy and the second zero energy may comprise leakage energy. In general terms any such leakage energy has a substantially smaller magnitude than the first summation of energy and the second summation of energy, respectively.

For example, although the first summation of energy and the second summation of energy according to some embodiments have been described as being provided by a respective sum-port ($\Sigma$), the energy may as well be summed at the delta-port ($\Delta$) in a case of sign shift at the input (and vice versa for the first zero energy and the second zero energy, respectively).

The invention claimed is:

1. A method for load balancing of a dual-polarized N/2-column antenna arrangement, the method being performed by a coupler module, comprising the steps of:
   receiving a first plurality of signals from a first set of N/2 power amplifiers of an N-channel radio;
   receiving a second plurality of signals from a second set of N/2 power amplifiers of the N-channel radio;
   directing a first summation of energy of the first plurality of signals to a first single output port of the coupler module connected to a first polarization of a first column of the dual-polarized N/2-column antenna arrangement;
   directing a second summation of energy of the second plurality of signals to a second single output port of the coupler module connected to a second polarization of a second column of the dual-polarized N/2-column antenna arrangement;
   directing a first zero energy of the first plurality of signals to at least a third single output port of the coupler module, wherein the first zero energy comprises leakage energy from the first plurality of signals, said leakage energy from the first plurality of signals substantially equal to zero; and
   directing a second zero energy of the second plurality of signals to at least a fourth single output port of the coupler module, wherein the second zero energy comprises leakage energy from the second plurality of signals, said leakage energy from the second plurality of signals substantially equal to zero.

2. The method according to claim 1, wherein orientation of said third single output port and said fourth single output port is mirrored compared to orientation of said first single output port and said second single output port.

3. The method according to claim 1, wherein said coupler module is configured using hybrid couplers, the method further comprising:
   preserving orthogonality between all individual signals from said first set and said second set.

4. The method according to claim 1, wherein N is 4 or 8.

5. The method according to claim 1, wherein signals from each one of said first set and said second set originate from multi-stream signals and one split single-stream signal.

6. The method according to claim 1, wherein signals from each one of said first set and said second set originate from multi-stream signals and one split single-stream signal, wherein scale factors are unique for each split single-stream signal, and wherein the unique scale factors have been applied to said split single-stream signal,
   wherein the unique scale factors are defined as $\alpha_n = e^{j\beta_n}$ where n is an integer indicating a unique scale factor and $\beta_n$ takes a value in the interval $[0, 2\pi]$.

7. The method according to claim 1, wherein signals from each one of said first set and said second set originate from multi-stream signals and one split single-stream signal, wherein scale factors are common for each split single-stream signal, and wherein the common scale factor has been applied to said split single-stream signal,
   wherein the common scale factor is defined as $\alpha = e^{j\beta}$ where the $\beta$ takes a value in the interval $[0, 2\pi]$.

8. The method according to claim 1, wherein signals from each one of said first set and said second set originate from multi-stream signals and one split single-stream signal, wherein scale factors are signed and have the same absolute value for each split single-stream signal, and wherein at least two of the scale factors which have opposite signs have been applied to said split single-stream signal, wherein the scale factors are defined as $\alpha_n = e^{j\beta n}$ where n is an integer indicating a scale factor and $\beta_n$ takes a value in the interval $[0, 2\pi]$.

9. The method according to claim 1, wherein signals from each one of said first set and said second set originate from multi-stream signals and two split single-stream signals, wherein scale factors are unique for each split single-stream signal, and wherein unique scale factors have been applied to said two split single-stream signals,
wherein the unique scale factors are defined as a $\alpha_n = e^{j\beta n}$ where n is an integer indicating a unique scale factor and $\beta_n$ and takes a value in the interval $[0, 2\pi]$.

10. The method according to claim 1, wherein signals from each one of said first set and said second set originate from multi-stream signals and two split single-stream signals, wherein scale factors are common for each split single-stream signal, and wherein a first common scale factor has been applied to one of said two split single-stream signals, and wherein a second common scale factor has been applied to another of said two split single-stream signals,
wherein the first and the second common scale factors are defined as $\alpha_n = e^{j\beta n}$ where n is an integer indicating a common scale factor and $\beta_n$ takes a value in the interval $[0, 2\pi]$.

11. The method according to claim 1, further comprising:
directing said first plurality of signals from said first set through a first N/2×N/2 Butler matrix, a first output port of which providing said first summation; and
directing said second plurality of signals from said second set through a second N/2×N/2 Butler matrix, a first output port of which providing said second summation.

12. The method according to claim 1, further comprising:
directing said first plurality of signals from said first set through a first N/2×N/2 Butler matrix, at least one second output port of which providing said first zero energy; and
directing said second plurality of signals from said second set through a second N/2×N/2 Butler matrix, at least one second output port of which providing said second zero energy.

13. A dual-polarized N/2-column antenna arrangement, the antenna module arrangement comprising a coupler module configured to:
receive a first plurality of signals from a first set of N/2 power amplifiers of an N-channel radio;
receive a second plurality of signals from a second set of N/2 power amplifiers of the N-channel radio;
direct a first summation of energy of the first plurality of signals to a first single output port of the coupler module connected to a first polarization of a first column of the dual-polarized N/2-column antenna arrangement;
direct a second summation of energy of the second plurality of signals to a second single output port of the coupler module connected to a second polarization of a second column of the dual-polarized N/2-column antenna arrangement;
direct a first zero energy of the first plurality of signals to at least a third single output port of the coupler module, wherein the first zero energy comprises leakage energy from the first plurality of signals, said leakage energy from the first plurality of signals substantially equal to zero; and
direct a second zero energy of the second plurality of signals to at least a fourth single output port of the coupler module, wherein the second zero energy comprises leakage energy from the second plurality of signals, said leakage energy from the second plurality of signals substantially equal to zero.

14. A network node comprising a dual-polarized N/2-column antenna arrangement, the antenna module arrangement comprising a coupler module configured to:
receive a first plurality of signals from a first set of N/2 power amplifiers of an N-channel radios
receive a second plurality of signals from a second set of N/2 power amplifiers of the N-channel radio;
direct a first summation of energy of the first plurality of signals to a first single output port of the coupler module connected to a first polarization of a first column of the dual-polarized N/2-column antenna arrangement;
direct a second summation of energy of the second plurality of signals to a second single output port of the coupler module connected to a second polarization of a second column of the dual-polarized N/2-column antenna arrangement;
direct a first zero energy of the first plurality of signals to at least a third single output port of the coupler module, wherein the first zero energy comprises leakage energy from the first plurality of signals, said leakage energy from the first plurality of signals substantially equal to zero; and
direct a second zero energy of the second plurality of signals to at least a fourth single output port of the coupler module, wherein the second zero energy comprises leakage energy from the second plurality of signals, said leakage energy from the second plurality of signals substantially equal to zero.

15. A wireless terminal comprising a dual-polarized N/2-column antenna arrangement, the antenna module arrangement comprising a coupler module configured to:
receive a first plurality of signals from a first set of N/2 power amplifiers of an N-channel radio;
receive a second plurality of signals from a second set of N/2 power amplifiers of the N-channel radio;
direct a first summation of energy of the first plurality of signals to a first single output port of the coupler module connected to a first polarization of a first column of the dual-polarized N/2-column antenna arrangement;
direct a second summation of energy of the second plurality of signals to a second single output port of the coupler module connected to a second polarization of a second column of the dual-polarized N/2-column antenna arrangement;
direct a first zero energy of the first plurality of signals to at least a third single output port of the coupler module, wherein the first zero energy comprises leakage energy from the first plurality of signals, said leakage energy from the first plurality of signals substantially equal to zero; and
direct a second zero energy of the second plurality of signals to at least a fourth single output port of the coupler module, wherein the second zero energy comprises leakage energy from the second plurality of signals, said leakage energy from the second plurality of signals substantially equal to zero.

* * * * *